United States Patent
Lin

(10) Patent No.: US 8,181,189 B2
(45) Date of Patent: May 15, 2012

(54) SYSTEM AND METHOD FOR DRIVING HARDWARE DEVICE AND PROCESSING DATA

(75) Inventor: Wei-Po Lin, Taipei (TW)

(73) Assignee: Asustek Computer Inc., Taipei (TW)

( * ) Notice: Subject to any disclaimer, the term of this patent is extended or adjusted under 35 U.S.C. 154(b) by 331 days.

(21) Appl. No.: 12/644,116

(22) Filed: Dec. 22, 2009

(65) Prior Publication Data

US 2010/0169900 A1    Jul. 1, 2010

(30) Foreign Application Priority Data

Dec. 31, 2008 (TW) .............................. 97151851 A

(51) Int. Cl.
*G06F 13/00* (2006.01)
(52) U.S. Cl. .................... 719/328; 719/321; 719/322
(58) Field of Classification Search .................. 719/328, 719/321, 322
See application file for complete search history.

(56) References Cited

U.S. PATENT DOCUMENTS

| | | | |
|---|---|---|---|
| 6,105,119 A * | 8/2000 | Kerr et al. ................. | 711/219 |
| 6,179,489 B1 * | 1/2001 | So et al. ................... | 718/102 |
| 6,845,508 B2 | 1/2005 | Parry | |
| 7,181,382 B2 | 2/2007 | Shier et al. | |
| 7,555,757 B2 * | 6/2009 | Smith et al. ............... | 719/328 |
| 2004/0230988 A1 | 11/2004 | Stokes et al. | |
| 2006/0161415 A1 | 7/2006 | Takahashi et al. | |
| 2009/0153540 A1 * | 6/2009 | Blinzer et al. ............. | 345/212 |

FOREIGN PATENT DOCUMENTS

| | | |
|---|---|---|
| CN | 1622599 | 6/2005 |
| CN | 1955929 | 5/2007 |
| CN | 101212677 | 7/2008 |

OTHER PUBLICATIONS

English language translation of abstract of CN 1622599 (published Jun. 1, 2005).
English language translation of abstract of CN 1955929 (published May 2, 2007).
English language translation of abstract of CN 101212677 (published Jul. 2, 2008).

* cited by examiner

*Primary Examiner* — Andy Ho
(74) *Attorney, Agent, or Firm* — Thomas|Kayden

(57) ABSTRACT

A system for driving a hardware device and processing data and a method thereof are provided. The system includes a storage unit, a processor, and the hardware device. The storage unit stores a multimedia application interface, a virtual window driving model (WDM) interface, and a multimedia application. The processor is electrically connected with the storage unit and used for executing a multimedia application. The hardware device receives or outputs first format data. When the multimedia application and the hardware device are active, the multimedia application interface and the virtual WDM interface are taken as communication interfaces between the multimedia application and the hardware device, and the virtual WDM interface converts the first format data to second format data and transmits the second format data to the multimedia application via the multimedia application interface, and the second format data is processed by the multimedia application.

15 Claims, 5 Drawing Sheets

SYSTEM AND METHOD FOR DRIVING HARDWARE DEVICE AND PROCESSING DATA

This application claims the benefit of Taiwan application Serial No. 97151851, filed Dec. 31, 2008, the subject matter of which is incorporated herein by reference.

BACKGROUND OF THE INVENTION

1. Field of the Invention

The invention relates to a system for driving a hardware device and a method thereof and processing data and, more particularly, to a system for driving a hardware device in a computer system and processing data and a method thereof.

2. Description of the Related Art

DirectX is a special multimedia application programming interface (API) used in Microsoft windows, and it allows a programmer to use the functions of various hardware without writing hardware code by himself or herself. The DirectX includes components such as DirectShow, DirectDraw, DirectSound, DirectInput, Direct3D, DirectAnimation, and DirectMusic. Various kinds of multimedia applications such as Yahoo VOIP, MSN VOIP, Skype, and Google Talk are gradually developed on the basis of the architecture of the DirectX.

Additionally, Microsoft launches a windows driver model (WDM) after Window 98, and the WDM and the DirectX are closely related to each other. The WDM is a design specification of a hardware device driver established by Microsoft and compatible with Microsoft operating systems, the hardware device performing the design specification is also called a WDM hardware device, and the brand, the model, and the pin of the WDM hardware device in the specification do not need to be considered. Consequently, if the WDM hardware device needs to be used by the multimedia application, integrated circuit (IC) manufacturers must first develop a WDM driver performing the design specification of the WDM according to Window driver development kit (DDK) of Microsoft, and then system manufacturers may utilize the WDM driver to drive the WDM hardware device.

For example, a web camera includes a complementary metal oxide semiconductor (CMOS) image sensor and a universal serial bus (USB) IC. USB IC manufacturers must provide the driver performing the WDM specification, and then the system manufacturer may normally drive the web camera.

However, if the USB IC manufacturers do not provide a correct WDM driver, the system manufacturers cannot amend or use the WDM hardware device.

Additionally, since parts of USB ICs do not have enough computing power or corresponding hardware design, it cannot support a color adjusting interface and a camera lens control interface regulated by the Directshow.

Moreover, since common multimedia applications such as MSN, VOIP, Skype, and Google Talk only support a standard audio input microphone and do not support a Bluetooth microphone, the multimedia applications such as MSN, VOIP, Skype, and Google Talk cannot capture multimedia information via the Bluetooth microphone.

BRIEF SUMMARY OF THE INVENTION

The invention relates to a system for driving a hardware device and processing data and a method thereof, and it at least includes the following advantages.

First, the Bluetooth microphone originally does not supporting the multimedia application, the multimedia application can play the audio data captured by the Bluetooth via a virtual WDM interface.

Second, system manufacturers may debug program or add additional functions at a virtual control interface or a virtual color adjusting interface by themselves to greatly improve added value, which does not need any hardware cost.

Third, the color adjusting interface and a camera lens control interface regulated by the Directshow are absolutely supported.

Fourth, the USB IC with low cost may be replaced with a USB IC with low cost quickly.

Fifth, the image quality in playing is improved via strong computing power of a central processing unit (CPU) or a graphic processor unit (GPU).

The invention provides a system for driving the hardware device and processing the data. The system includes a storage unit, a processor, and the hardware device. The storage unit stores a multimedia application interface, a virtual WDM interface, and a multimedia application. The processor is electrically connected with the storage unit and used for executing the multimedia application. The hardware device receives or outputs first format data. When the multimedia application and the hardware device are active, the multimedia application interface and the virtual WDM interface are taken as communication interfaces between the multimedia application and the hardware device, the virtual WDM interface converts the first format data to second format data and transmits the second format data to the multimedia application via the multimedia application interface, and the second format data is processed by the multimedia application.

The invention provides a method for driving a hardware device and processing data. The method includes the following steps. First, a multimedia application interface, a virtual WDM interface, and a multimedia application are stored. Second, the multimedia application is executed. Third, the first format data is received or outputted via the hardware device. When the multimedia application and the hardware device are active, the multimedia application interface and the virtual WDM interface are taken as communication interfaces between the multimedia application and the hardware device, the virtual WDM interface converts the first format data to second format data and transmits the second format data to the multimedia application via the multimedia application interface, and the second format data is processed by the multimedia application.

These and other features, aspects and advantages of the present invention will become better understood with regard to the following description, appended claims, and accompanying drawings.

DETAILED DESCRIPTION OF THE EMBODIMENTS

Figure 1:
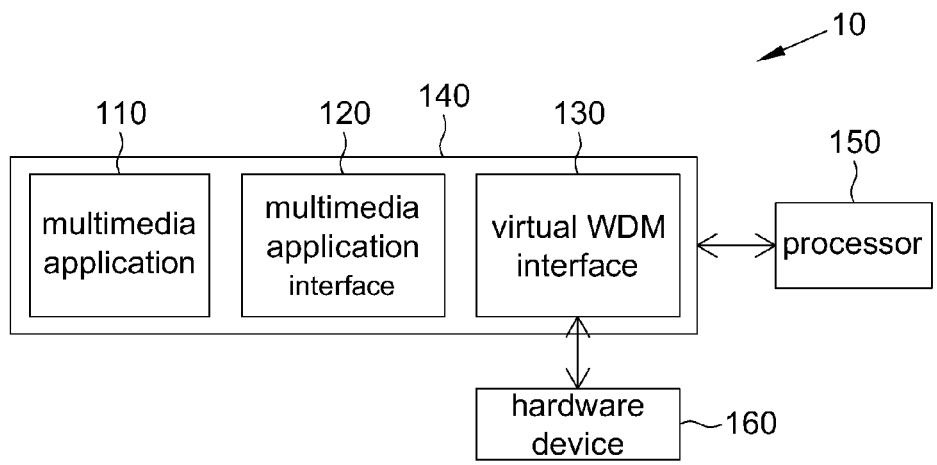
FIG. 1 is a block diagram showing a system for driving a hardware device and processing data.
Figure 2:
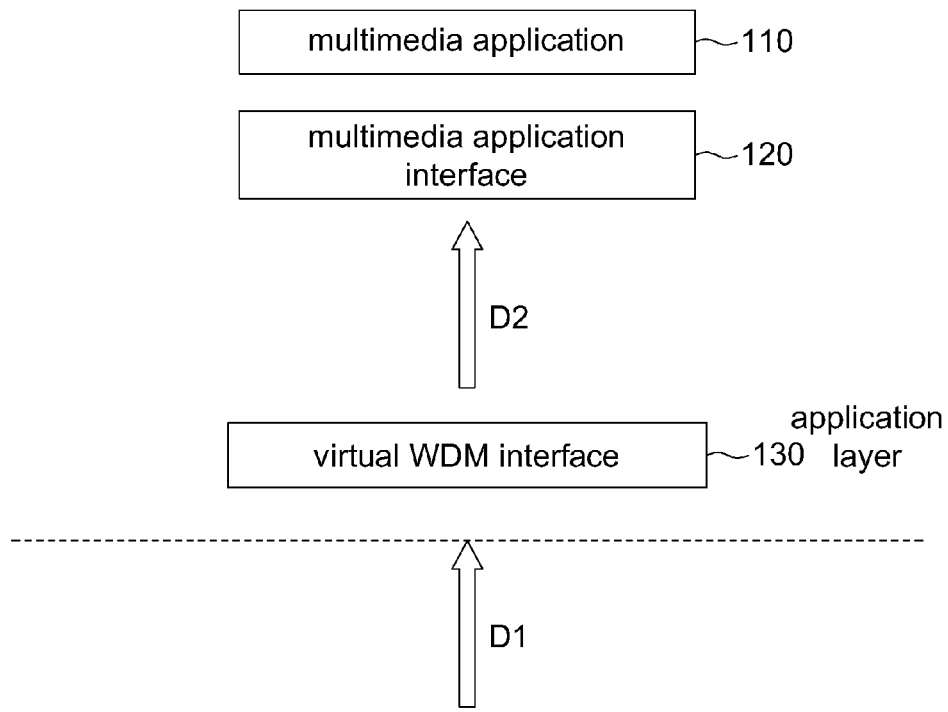
FIG. 2 is a schematic diagram showing architecture of a multimedia application, a multimedia application interface, and a virtual WDM interface.

FIG. 1 is a block diagram showing a system for driving a hardware device and processing data. FIG. 2 is a schematic diagram showing architecture of a multimedia application, a multimedia application interface, and a virtual WDM interface. A system 10 for driving the hardware device and processing the data includes a hardware device 160, a storage unit 140, and a processor 150 electrically connected with the storage unit 140. The storage unit 140 is used for storing a multimedia application 110, a multimedia application interface 120, and a virtual WDM interface 130. The hardware device 160 is used for receiving or outputting first format data. The processor 150 is used for executing the multimedia application 110.

When the multimedia application 110 and the hardware device 160 are active, the multimedia application interface 120 and the virtual WDM interface 130 are taken as communication interfaces between the multimedia application 110 and the hardware device 160, the virtual WDM interface 130 converts first format data D1 to second format data D2 and transmits the second format data D2 to the multimedia application 110 via the multimedia application interface 120, and the second format data D2 is processed by the multimedia application 110. In this embodiment, the multimedia application 110 may be an instant messenger such as Yahoo VOIP, MSN VOIP, Skype, or Google Talk, the multimedia application interface 120 may be DirectX, and the DirectX may further include the components such as DirectShow, DirectDraw, DirectSound, DirectInput, Direct3D, DirectAnimation, and DirectMusic.

The first format data D1 received or outputted by the hardware device 160 is the data stored in a hard disk or captured via the hardware device. For example, the first format data D1 received by the virtual WDM interface 130 may be obtained by capturing external sound or images by the hardware device such as a Bluetooth microphone or a web camera. First embodiments to a third embodiment are taken as examples to illustrate the invention hereinafter, but the invention is not limited thereto. Persons having ordinary skill in the art may make various modifications and changes without departing from the scope and spirit of the invention.

First Embodiment

Figure 3:
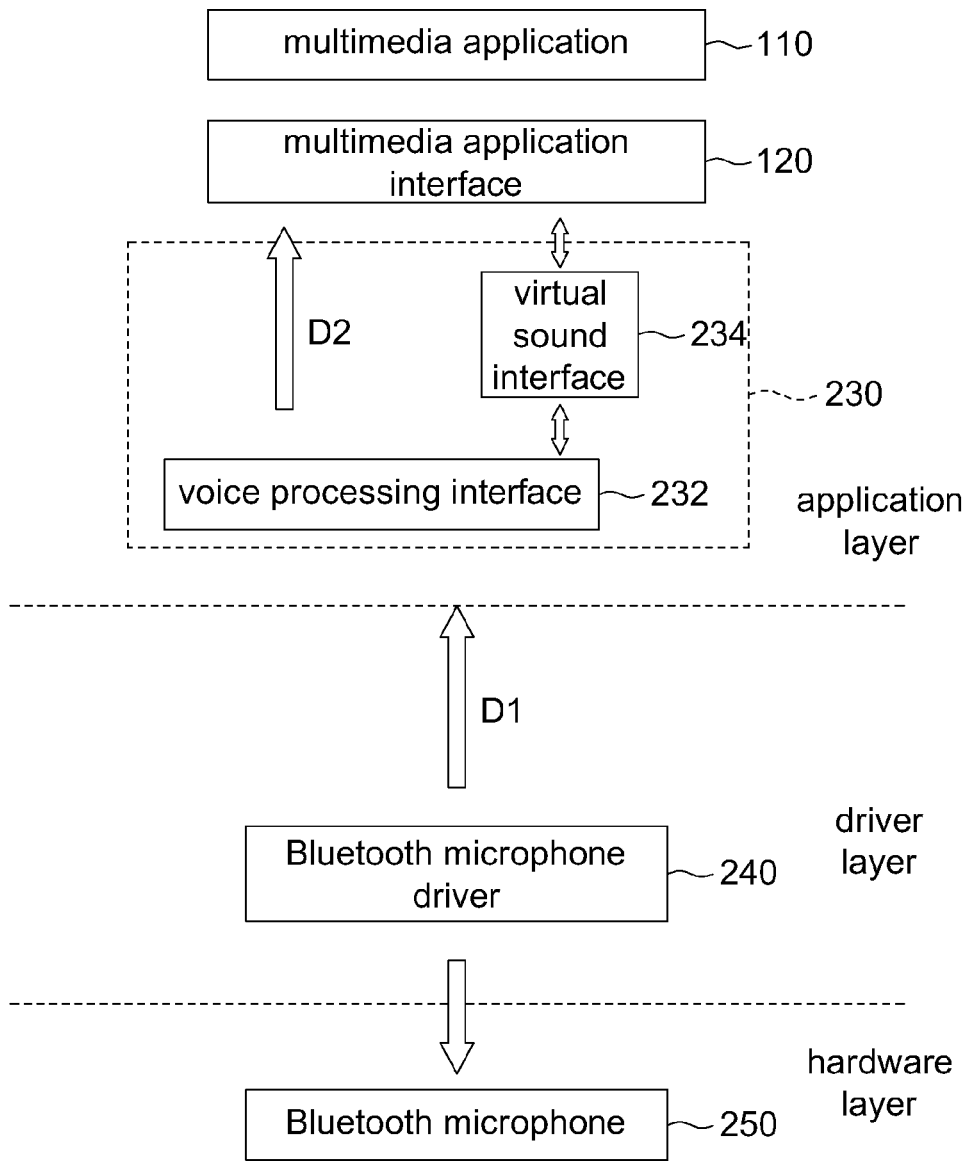
FIG. 3 is a schematic diagram showing architecture of the invention according to a first embodiment of the invention.

FIG. 3 is a schematic diagram showing architecture of the invention according to a first embodiment of the invention. A virtual WDM interface 230 is taken as an example to illustrate the virtual WDM interface 130 in the first embodiment. When the first format data D1 is captured via a Bluetooth microphone 250, the virtual WDM interface 230 receives the first format data D1 via a Bluetooth microphone driver 240.

Since the multimedia application interface 120 does not support the Bluetooth microphone 250, the multimedia application 110 cannot directly play the first format data D1 captured by the Bluetooth microphone 250. To solve this problem, the virtual WDM interface 230 includes a voice processing interface 232 converting the first format data D1 to the second format data D2.

Since the multimedia application interface 120 can receive the second format data D2, the multimedia application 110 can receive the second format data D2 via the multimedia application interface 120 to play accordingly. As a result, the Bluetooth microphone 250 originally does not supporting the multimedia application 110. The multimedia application can play the audio data captured by the Bluetooth via a virtual WDM interface.

Moreover, the virtual WDM interface 230 further includes a virtual sound interface 234 of the Bluetooth microphone 250. The virtual sound interface 234 is used for processing the sound effect of the second format data D2 to obtain better sound effect. The sound effects processing may be reducing an echo.

Second Embodiment

Figure 4:
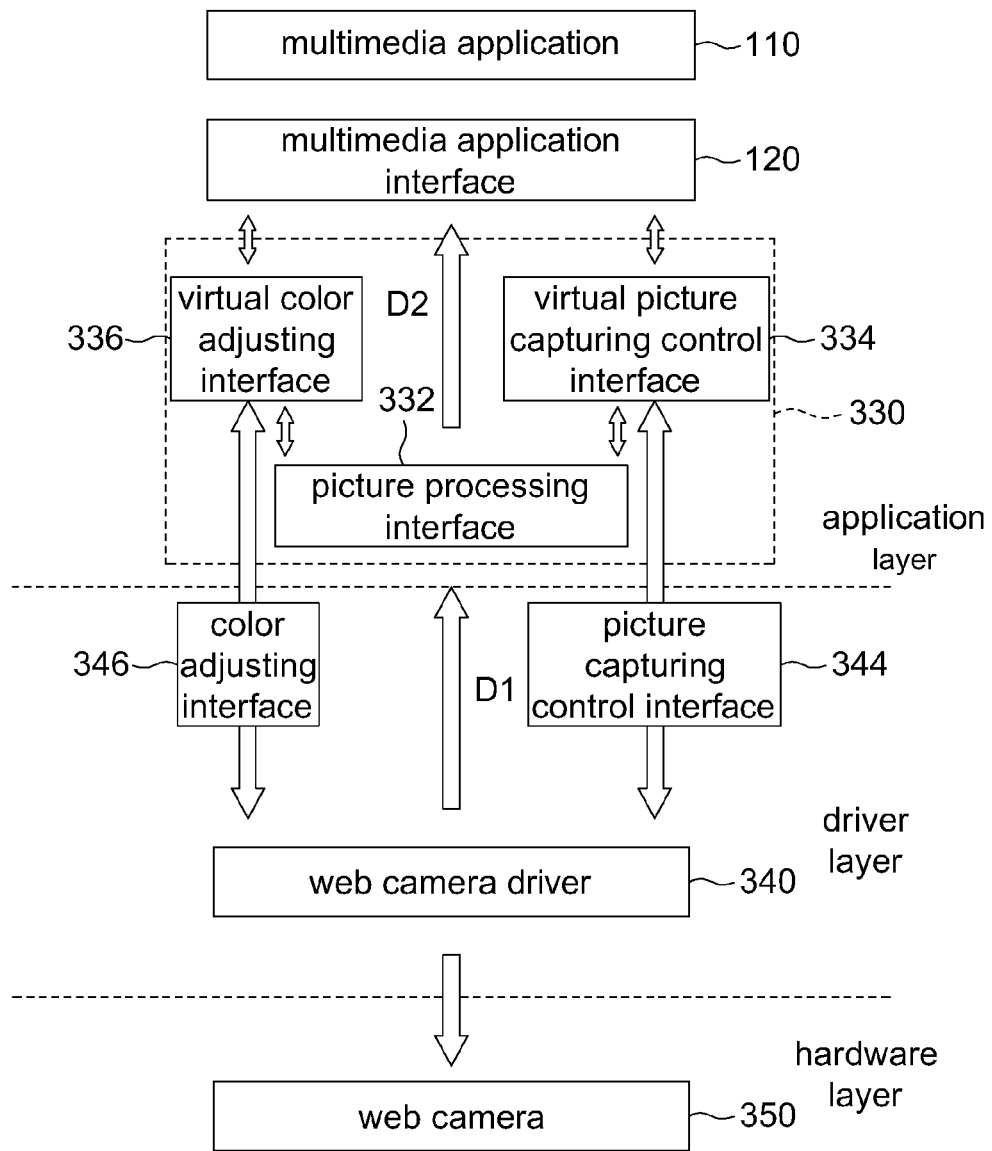
FIG. 4 is a schematic diagram showing architecture of the invention according to a second embodiment of the invention.

FIG. 4 is a schematic diagram showing the architecture of the invention according to a second embodiment of the invention. A virtual WDM interface 330 is taken as an example to illustrate the virtual WDM interface 130 in the second embodiment. When the first format data D1 is captured by a web camera 350, the virtual WDM interface 330 receives the first format data D1 via a web camera driver 340. A web camera driver 340, a picture capturing control interface 344, and a color adjusting interface 346 may be provided by USB IC manufacturers.

Since the multimedia application interface 120 in the second embodiment does not support the web camera 350, the multimedia application 110 cannot directly play the first format data D1 captured by the web camera 350. To solve this problem, the virtual WDM interface 330 includes a picture processing interface 332. The picture processing interface 332 converts the first format data D1 to the second format data D2.

Since the multimedia application interface 120 can receive the second format data D2, the multimedia application 110 receive the second format data D2 via the multimedia application interface 120 to play accordingly. As a result, the web camera 350 originally not supporting the multimedia application 110 can support the multimedia application 110 via the virtual WDM interface 330.

The virtual WDM interface 330 further includes a virtual picture capturing control interface 334 and a virtual color adjusting interface 336. The virtual picture capturing control interface 334 and the virtual color adjusting interface 336 may be obtained by intercepting the picture capturing control interface 344 and the color adjusting interface 346. The virtual picture capturing control interface 334 is used for controlling the functions of a camera lens of the web camera 350 such as zoom of the camera lens or the upward, downward, leftward, and rightward movement of the camera lens. The virtual color adjusting interface 336 is used for adjusting color such as hue, saturation, brightness or contrast of second format data D2.

Since the virtual WDM interface 330 is at an application layer, system manufacturers can debug program via the virtual WDM interface 330 by themselves, which does not need to depend on technical support of the USB IC manufacturers. Additionally, the system manufacturers may add additional functions via the virtual WDM interface 330 by themselves to greatly increase added value, which does not need any hardware cost.

The virtual WDM interface 330 can intercept a function requirement such as a camera lens control or a color adjustment transmitted by the original multimedia application 110, and the function requirement is processed by utilizing strong computing power of a CPU or a GPU. As a result, even the cheap USB IC does not have the enough computing power or a corresponding hardware design; it can absolutely support a color adjusting interface and a camera lens control interface regulated by the Directshow via the virtual WDM interface 330. Consequently, the system manufacturer can quickly replace the original USB IC with the USB IC with low cost, and the image quality in playing is greatly improved via the strong computing power of the CPU or the GPU.

Third Embodiment

Figure 5:
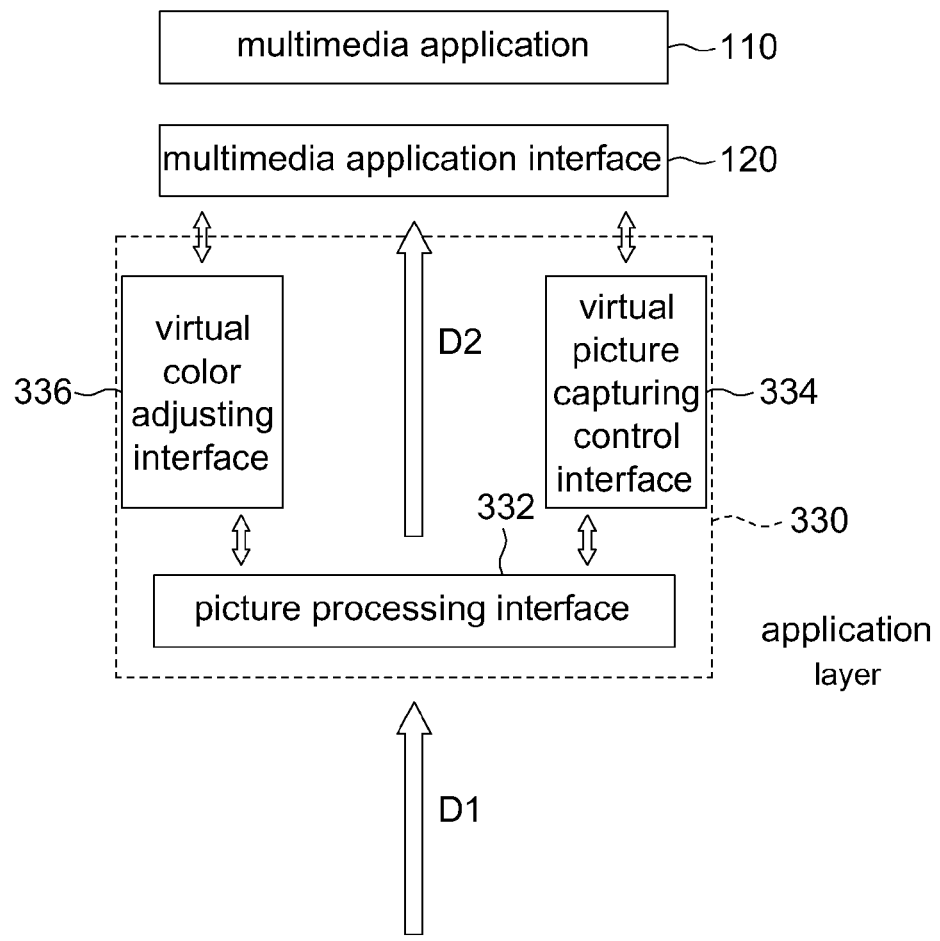
FIG. 5 is a schematic diagram showing architecture of the invention according to a third embodiment of the invention.

FIG. 5 is a schematic diagram showing architecture of the invention according to a third embodiment of the invention. The virtual WDM interface 330 is taken as an example to illustrate the virtual WDM interface 130 in the third embodiment. In the third embodiment, the first format data D1 may be a multimedia file such as MPEG2, MPEG4, WMV, AVI, JPEG, BMP, GIF, PIIG, MP3, WAV, or AAC. The picture processing interface 332 converts the first format data D1 to the second format data D2.

Since the multimedia application interface 120 can receive the second format data D2, the multimedia application 110 receives the second format data D2 via the multimedia application interface 120 to play accordingly. As a result, the second format data D1 originally not supporting the multimedia application 110 can support the multimedia application 110 via the virtual WDM interface 330. As a result, the multimedia application 110 can play various kinds of the multimedia files such as various kinds of movies and pictures via the virtual WDM interface 330.

Figure 6:
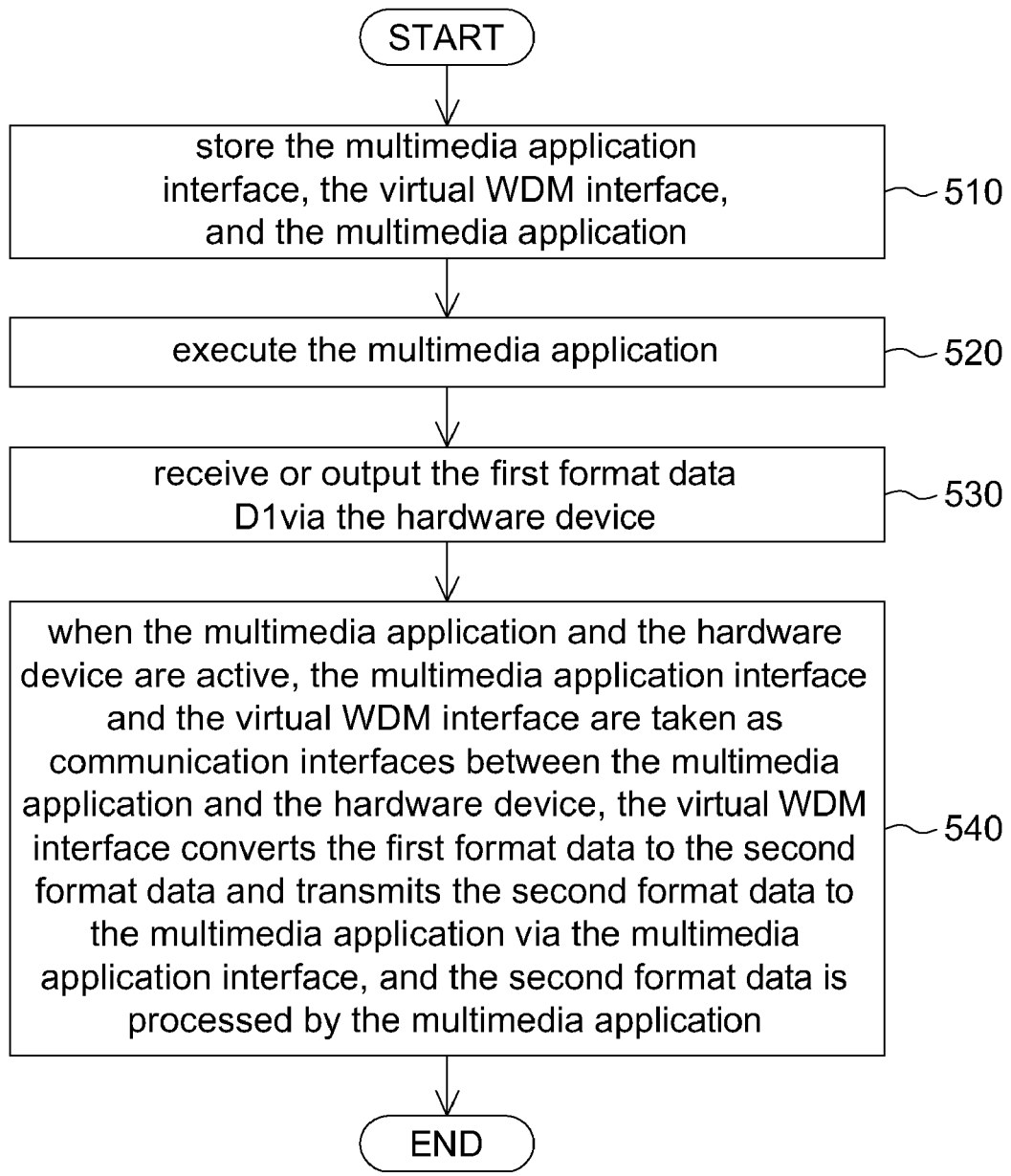
FIG. 6 is a flow chart showing a method for driving a hardware device and processing data according to an embodiment of the invention.

FIG. 6 is a flow chart showing a method for driving a hardware device and processing data according to an embodiment of the invention. The method for driving the hardware device and processing the data is used at the system 10 for driving the hardware device and processing data, and the method includes the following steps.

First, as shown at step 510, the storage unit 140 stores the multimedia application interface 120, the virtual WDM interface 130, and the multimedia application 114. Second, as shown at step 520, the processor 150 executes the multimedia application 110. Third, as shown at step 530, the first format data D1 is received or outputted via the hardware device 160. Fourth, as shown at step 540, when the multimedia application 110 and the hardware device 160 are active, the multimedia application interface 120 and the virtual WDM interface 130 are taken as the communication interfaces between the multimedia application 110 and the hardware device 160, the virtual WDM interface 130 converts the first format data D1 to the second format data D2 and transmits the second format data D2 to the multimedia application 110 via the multimedia application interface 120, and the second format data D2 is processed by the multimedia application 110.

The system for driving the hardware device and processing the data and the method thereof according to the invention at least include the following advantages.

First, the Bluetooth microphone originally does not supporting the multimedia application. The multimedia application can play the audio data captured by the Bluetooth via a virtual WDM interface.

Second, the system manufacturers can debug program or add additional functions at the virtual control interface or the virtual color adjusting interface by themselves to greatly increase the added value, which does not need any hardware cost.

Third, the color adjusting interface and a camera lens control interface regulated by the Directshow are absolutely supported.

Fourth, the original USB IC may be replaced with the USB IC with low cost quickly.

Fifth, the image quality in playing is improved via the strong computing power of the CPU or the GPU.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A system for driving a hardware device and processing data, comprising:
    a storage unit for storing a multimedia application interface, a virtual windows driver model (WDM) interface, and a multimedia application;
    a processor, electrically connected with the storage unit, for executing the multimedia application; and
    the hardware device for receiving or outputting first format data, wherein when the multimedia application and the hardware device are active, the multimedia application interface and the virtual WDM interface are taken as communication interfaces between the multimedia application and the hardware device, the virtual WDM interface converts the first format data to second format data and transmits the second format data to the multimedia application via the multimedia application interface, and the second format data is processed by the multimedia application.

2. The system according to claim 1, wherein the hardware device is a Bluetooth microphone, the virtual WDM interface comprises a voice processing interface and a virtual sound interface, the voice processing interface converts the first format data to the second format data.

3. The system according to claim 2, wherein the virtual WDM interface further comprises a virtual sound interface for processing the sound effect of the second format data.

4. The system according to claim 1, wherein the hardware device is a web camera.

5. The system according to claim 4, wherein the virtual WDM interface comprises a picture processing interface converting the first format data to the second format data.

6. The system according to claim 4, wherein virtual WDM interface further comprises a virtual picture capturing control interface of the web camera, and the virtual picture capturing control interface is used for controlling a camera lens of the web camera.

7. The system according to claim 4, wherein the virtual WDM interface further comprises a virtual color adjusting interface of the web camera, and the virtual color adjusting interface is used for adjusting color of the second format data.

8. The system according to claim 1, wherein the multimedia application is an instant messenger.

9. A method for driving a hardware device and processing data, comprising:
    storing a multimedia application interface, a virtual WDM interface, and a multimedia application;
    executing the multimedia application;
    receiving or outputting first format data via the hardware device; and
    wherein when the multimedia application and the hardware device are active, the multimedia application interface and the virtual WDM interface are taken as communication interfaces between the multimedia application and the hardware device, the virtual WDM interface converts the first format data to second format data and transmits the second format data to the multimedia application via the multimedia application interface, and the second format data is processed by the multimedia application.

10. The method according to claim 9, wherein the hardware device is a Bluetooth microphone.

11. The method according to claim 10, wherein the virtual WDM interface comprises a voice processing interface, and when the multimedia application and the hardware device are active, the first format data is converted to the second format data via the voice processing interface.

12. The method according to claim 10, wherein the virtual WDM interface further comprises a virtual sound interface, and the method further comprises:
processing sound effect of the second format data via the virtual sound interface.

13. The method according to claim 9, wherein the hardware device is a web camera, the virtual WDM interface comprises a picture processing interface, and when the multimedia application and the hardware device are active, the first format data is converted to the second format data via the picture processing interface.

14. The method according to claim 9, wherein the hardware device is a web camera, the virtual WDM interface further comprises a virtual picture capturing control interface of the web camera, and the method further comprises:
controlling a camera lens of the web camera via the virtual picture capturing control interface.

15. The method according to claim 9, wherein the hardware device is a web camera, the virtual WDM interface further comprises a virtual color adjusting interface of the web camera, and the method further comprises:
adjusting color of the second format data via the virtual color adjusting interface.

* * * * *